US 6,672,662 B1

(12) United States Patent
Balk

(10) Patent No.: US 6,672,662 B1
(45) Date of Patent: Jan. 6, 2004

(54) VEHICLE SEAT

(75) Inventor: Chad Balk, Birmingham, MI (US)

(73) Assignee: Lear Corporation, Southfield, MI (US)

(*) Notice: Subject to any disclaimer, the term of this patent is extended or adjusted under 35 U.S.C. 154(b) by 83 days.

(21) Appl. No.: 10/036,313

(22) Filed: Dec. 26, 2001

(51) Int. Cl.[7] .............................................. A47C 15/00
(52) U.S. Cl. ..................... 297/244; 297/238; 297/378.1
(58) Field of Search ....................... 297/452.56, 378.13, 297/378.1, 244, 238, 235, 234, 331, 340, 341, 378.12; 296/65.01, 65.05, 65.16

(56) References Cited

U.S. PATENT DOCUMENTS

| 2,797,732 A | | 7/1957 | Thomas |
| 2,993,529 A | * | 7/1961 | Brown |
| 3,394,417 A | * | 7/1968 | O'Link |
| 4,227,736 A | | 10/1980 | Lebault et al. |
| 4,519,646 A | | 5/1985 | Leitermann et al. |
| 4,544,199 A | * | 10/1985 | Wrigley |
| 4,799,632 A | * | 1/1989 | Baymak et al. |
| 4,836,597 A | | 6/1989 | Izumida |
| 4,946,216 A | | 8/1990 | Demick |
| 4,971,379 A | | 11/1990 | Rumpel et al. |
| 4,978,158 A | | 12/1990 | Kubo et al. |
| 5,013,089 A | * | 5/1991 | Abu-Isa et al. |
| 5,050,932 A | * | 9/1991 | Pipon et al. |
| 5,454,613 A | * | 10/1995 | Weber et al. |
| 5,482,346 A | | 1/1996 | Lesourd |
| 5,707,103 A | | 1/1998 | Balk |

* cited by examiner

Primary Examiner—Milton Nelson, Jr.
(74) Attorney, Agent, or Firm—Bill C. Panagos

(57) ABSTRACT

A vehicle seat assembly including a forward facing first seat back having an upper portion and a lower portion. The seat assembly further includes a rearward facing second seat assembly having a second seat back. The second seat back has a lower portion and an upper portion pivotally connected to the upper portion of the first seat back. The second seat back is movable between a retracted position and a seating position. In the retracted position, the lower portion of the second seat back is adjacent to the lower portion of the first seat back. In the seating position, the lower portion of the second seat back is spaced apart from the lower portion of the first seat back to provide a rearwardly facing inclined second seat back.

20 Claims, 3 Drawing Sheets

VEHICLE SEAT

BACKGROUND OF THE INVENTION

Vehicles, such as automobiles and other passenger vehicles employ seats in the interior compartment of the vehicles. The seats are useful to support passengers being transported in the vehicles in relative safety and comfort. The seats are often positioned in rows, most passenger vehicles having two or three rows of seats. It is often desirable to remove some of the rows of seats to increase the cargo area of the vehicle. However, removable seats can be expensive, heavy, and difficult to remove from the vehicle. Seats which are not removable require much room in of the interior compartment.

The cargo area, or storage area, is likewise useful to include in the interior compartment of the vehicles. The cargo area is sometimes available toward a rearward portion of the vehicles, such as behind the rows of seats. It is often desirable to employ additional cargo area for additional cargo. Thus, it is also desirable to have an interior compartment that can easily accommodate additional seating area and additional cargo area.

BRIEF SUMMARY OF THE INVENTION

This invention relates to a vehicle seat which includes two oppositely facing seat backs pivotally connected to one another.

The vehicle seat assembly includes a forward facing first seat back having an upper portion and a lower portion. The seat assembly further includes a rearward facing second seat assembly having a second seat back. The second seat back has a lower portion and an upper portion pivotally connected to the upper portion of the first seat back. The second seat back is movable between a retracted position and a seating position. In the retracted position, the lower portion of the second seat back is adjacent to the lower portion of the first seat back. In the seating position, the lower portion of the second seat back is spaced apart from the lower portion of the first seat back to provide a rearwardly facing inclined second seat back.

Various objects and advantages of this invention will become apparent to those skilled in the art from the following detailed description of the preferred embodiment, when read in light of the accompanying drawings.

DETAILED DESCRIPTION OF THE INVENTION

Figure 1:
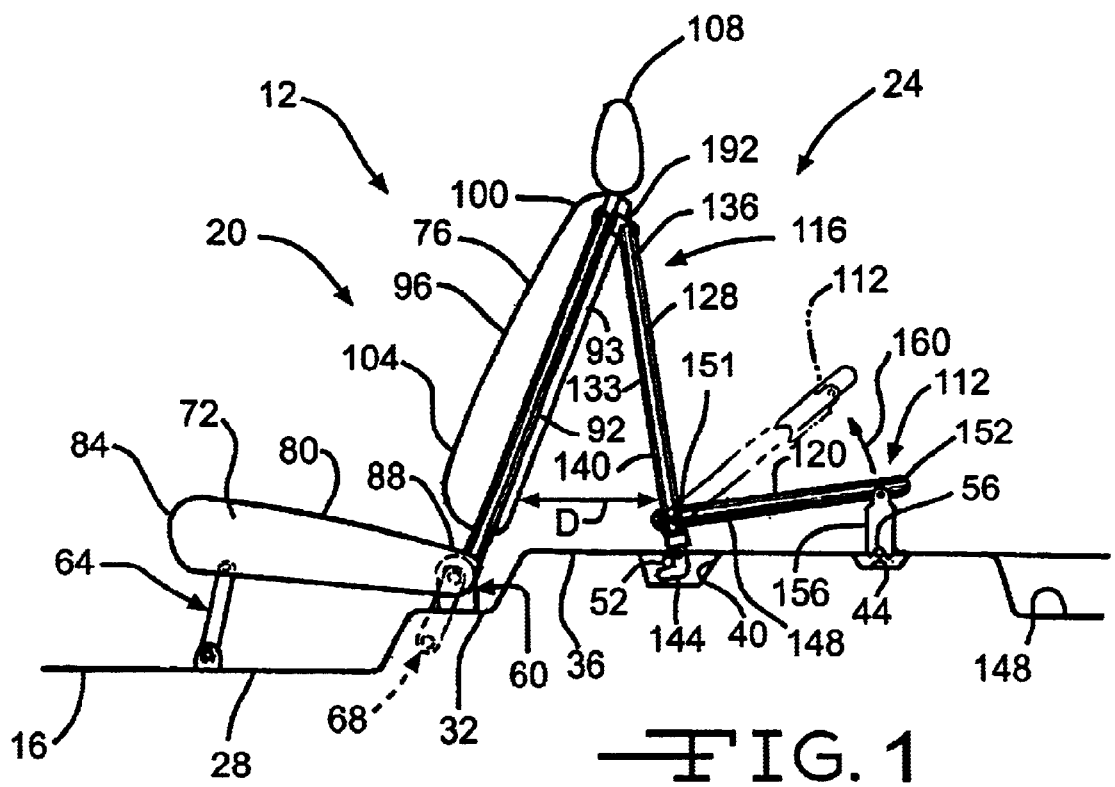
FIG. 1 is a schematic of a side view in elevation of a vehicle seat assembly according to the invention showing a rearward facing seat assembly in a seating postion.
Figure 2:
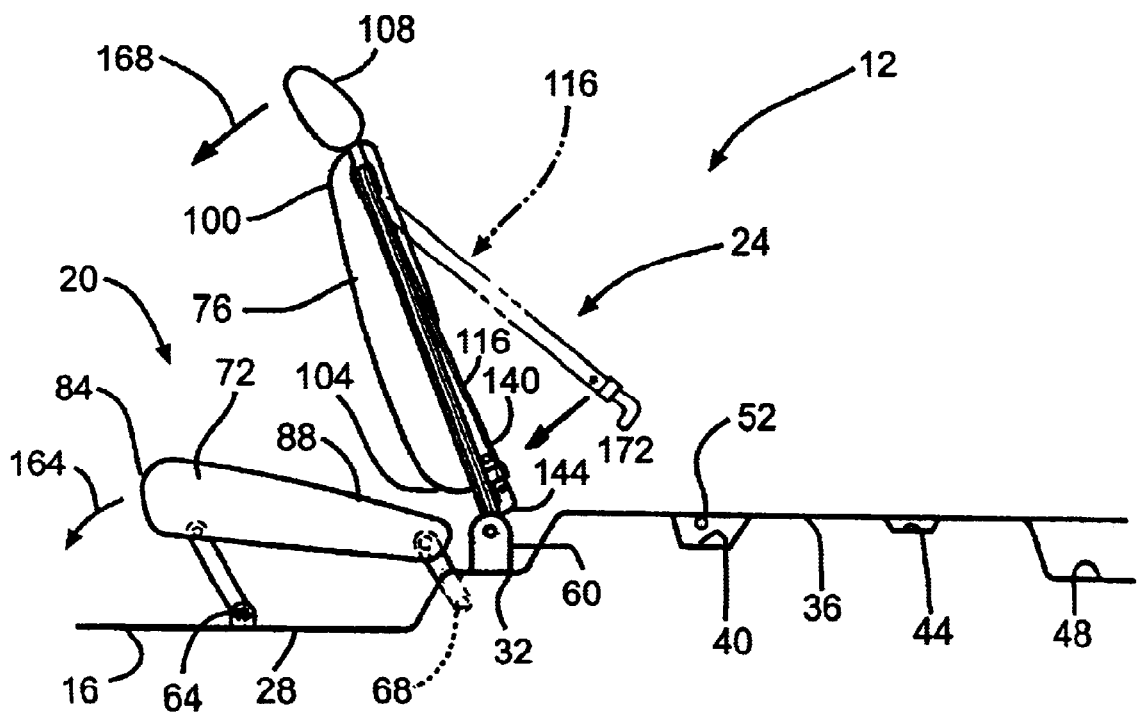
FIG. 2 is a schematic of a side view in elevation of the vehicle seat assembly of FIG. 1 with the rearward facing seat assembly moved from the seating position into a retracted position.
Figure 3:
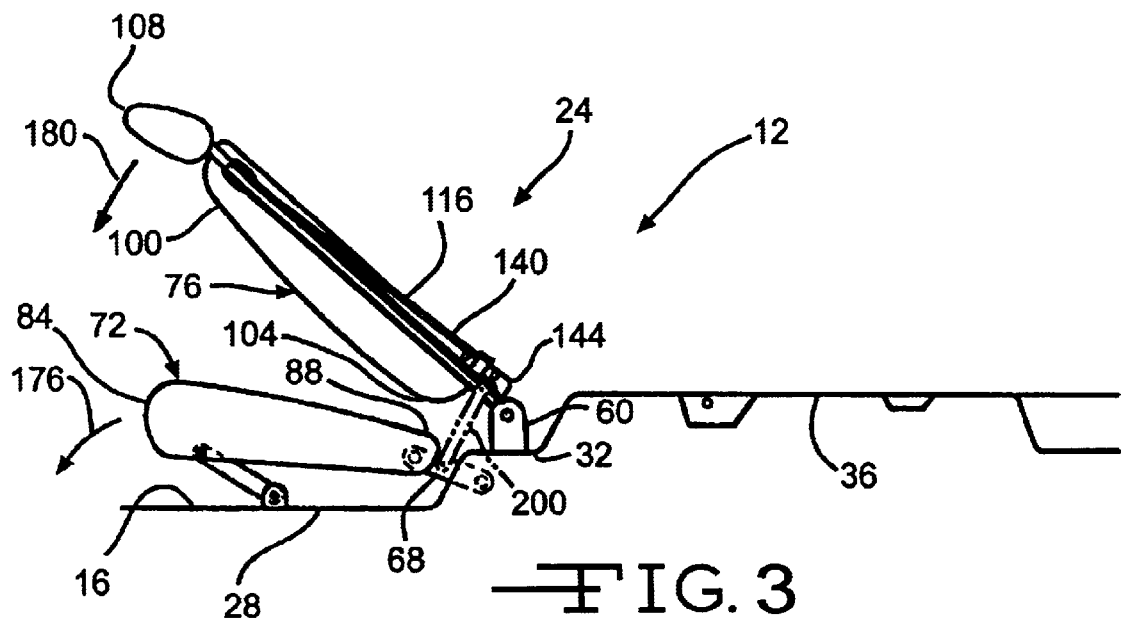
FIG. 3 is a schematic of a side view in elevation of the vehicle seat assembly of FIG. 1 with a forward facing first seat back moved from a seating position into a retracted position.
Figure 4:
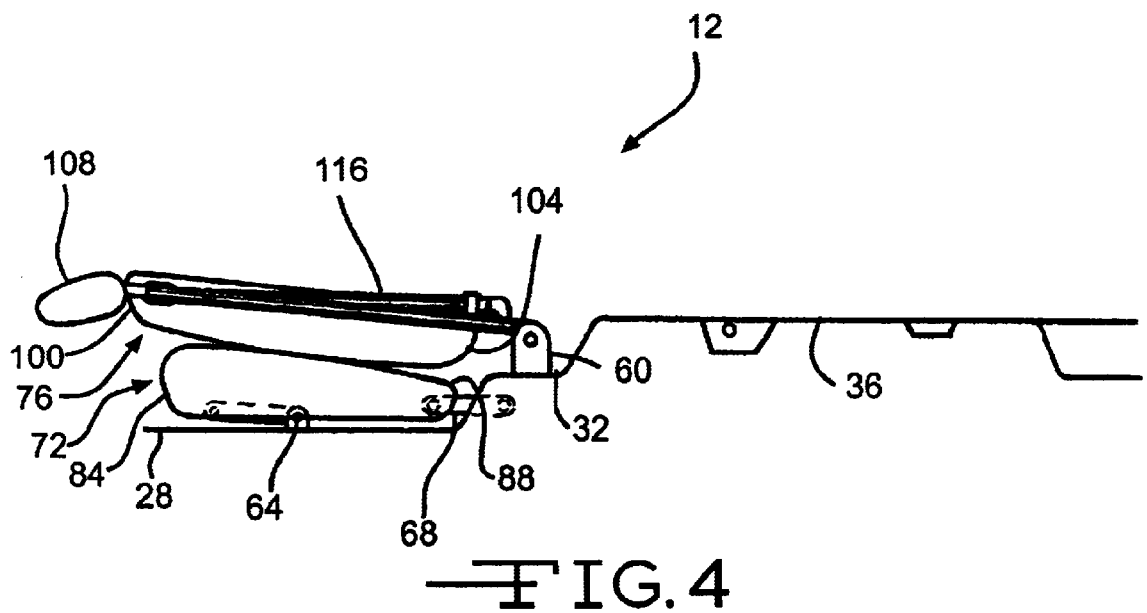
FIG. 4 is a schematic of a side view in elevation of the vehicle seat assembly of FIG. 1 with the forward facing first seat back in the retracted position.
Figure 5:
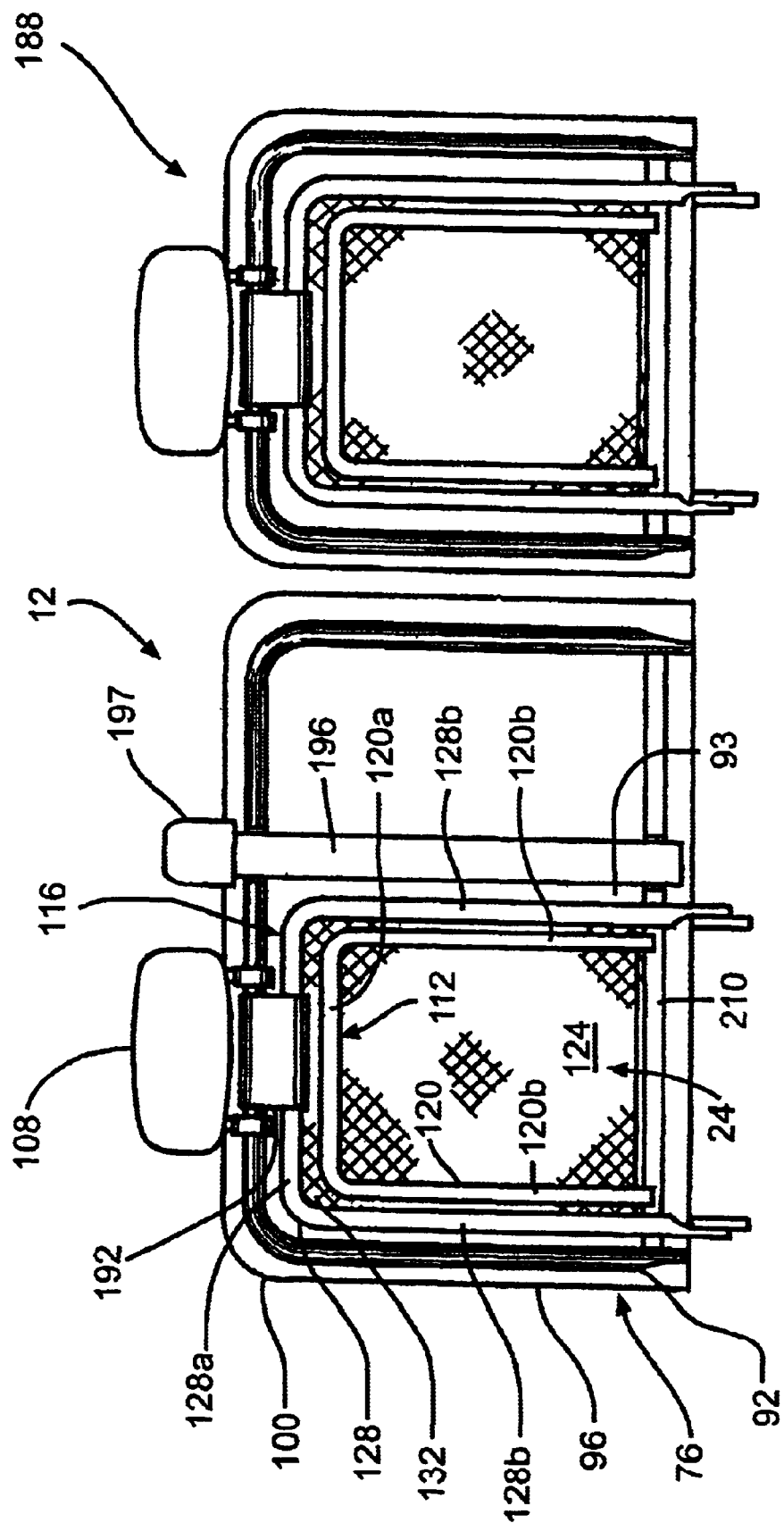
FIG. 5 is a schematic of a rear end view in elevation of the vehicle seat assembly of FIG. 2 wherein the rearward facing seat assembly is in its retracted position.

Referring now to FIGS. 1 through 4, a vehicle seat assembly according to the invention is indicated generally at 12. The illustrated vehicle seat assembly 12 can be used as any type of vehicle seat, such as a lightweight and low cost driver seat or passenger seat of a vehicle. However, it is contemplated that the seat assembly 12 is ideally suited as a second or third row seat in a minivan or a sport utility vehicle. Although the invention is illustrated for use in a vehicle, it should be understood that the invention could also be used in other types of seats, such as lawn furniture seats and home furniture seats. The vehicle seat assembly 12 includes a floor or platform 16 of the vehicle, which can have contoured shape. The platform is adapted to support a forward facing first seat assembly, indicated generally at 20, and a rearward facing second seat assembly, indicated generally at 24. As will be discussed below, the second seat assembly 24 is operatively connected to the first seat assembly 20, and can be moved between a seating position, as shown in FIG. 1, and a stored or retracted position, as shown in FIGS. 3–5, to increase cargo area directly behind the second seat assembly 24.

As discussed further below with respect to FIG. 5, the seat assemblies 20 and 24 can be configured to be a single occupant seat or a multiple occupant seat, commonly referred to as a bench-style seat, having a greater width than a single occupant seat. The seat assemblies 20 and 24 may also be formed as a "split" seat wherein separate portions of the seat backs are pivotable to a forward tilted position relative to another portion of the seat back. The split style seating allows a portion of the seat back to be tilted forward for increased cargo area yet retain one or more seating positions.

The illustrated platform 16 includes three tiers; a front tier 28, which is proximate to a middle tier 32, and a back tier 36. It will be appreciated that the front tier 28, the middle tier 32, and the back tier 36 are in a stepped relationship with respect to each other, the front tier 28 being lower (in FIG. 1) than the middle tier 32, and the back tier 36 being raised above the middle tier 32 and the front tier 28. The front tier 28, the middle tier 32 and the back tier 36 are preferably generally flat surfaces and about parallel to each other for the illustrated platform 16. Although the platform 16 is shown having a stepped characteristic, it should be understood that the platform 16 might be designed in any suitable way to support the first seat assembly 20 and the second seat assembly 24.

The three tiers 28, 32, and 36 preferably include additional features as follow. The illustrated back tier 36 preferably includes three recesses formed in the platform 16; a first recess 40, a second recess 44, and a third recess 48. The first recess 40 and the second recess 44 cooperate to support the second seat assembly 24. The first recess 40 houses a first protrusion 52 to support the second seat assembly 24, and the second recess 44 houses a second protrusion 56 to support the second seat assembly 24, as further described herein. The illustrated middle tier 32 supports a middle mount 60 for a purpose to be described below. The illustrated front tier 28 supports a front mount 64 that cooperates with an intermediate mount 68 for a purpose to be described below. The front mount 64 and the intermediate mount 68 are preferably pivotally mounted relative to the platform 16 and the first seat bottom 72.

The illustrated first seat assembly 20 includes a first seat bottom 72 and a first seat back 76. The illustrated first seat bottom 72 includes a first seat bottom frame (not shown) to support a first seat bottom cushion or pad 80. The first seat bottom pad 80 is preferably adapted to allow a passenger (not shown) sitting in the first seat assembly 20 to do so in relative comfort. The first seat bottom pad 80 can be formed of any suitable material or combination of materials, such as for example a foam cushion and an outer trim material, such as cloth or leather. A front portion 84 of the first seat bottom 72 is preferably supported by the front mount 64. A back portion 88 of the first seat bottom 72 is preferably supported by the intermediate mount 68.

The illustrated first seat back 76 includes a first seat back frame 92, as best shown in FIG. 5, and a first seat back cushion or pad 96. The first seat back frame 92 and the first seat back pad 96 preferably extend from an upper portion 100 to a lower portion 104 of the first seat back 76. The first seat back frame 92 is preferably a generally inverted "U" shaped member. The first seat back pad 96 is preferably adapted to allow a passenger (not shown) sitting in the first seat assembly 20 to do so in relative comfort. The first seat back pad 96 can be formed of any suitable material or combination of materials, similar to the first seat bottom pad 80. The lower portion 104 of the first seat back frame 92 is preferably operatively connected to the middle mount 60, and more preferably pivotally connected to the middle mount 60.

The upper portion 100 of the illustrated first seat back 76 supports a headrest 108. The headrest 108 can be used as a headrest for occupant sitting in both the first seat assembly 20 and the second seat assembly 24. Thus, the seat assemblies 20 and 24 share the common headrest 108. If desired, the second seat assembly 24 could include a separate headrest (not shown) therefor.

The illustrated second seat assembly 24 includes a second seat bottom 112 and a second seat back 116. The illustrated second seat bottom 112 includes a second seat bottom frame 120 to support a second seat bottom cushion or pad 124, as best shown in FIG. 5. The illustrated second seat back 116 includes a second seat back frame 128 and a second seat back cushion or pad 132. The second seat back frame 128 is preferably a generally inverted "U" shaped member, as best shown in FIG. 5. The back frame 128 has a generally straight horizontal member 128a and a pair of generally straight parallel members 128b extending downwardly from the ends of the member 128a. The bottom frame 120 has a generally straight horizontal member 120a and a pair of generally straight parallel members 120b extending downwardly from the ends of the member 120a. The second seat back frame 128 is preferably larger in width and height than the second seat bottom frame 120, thus allowing the second seat bottom frame 120 to nest within the second seat back frame 128 when the second seat assembly is in its retracted position, as shown in FIG. 5. Thus, the frames 120 and 128 can generally lie within a common plane defined by their U-shape configuration when in their retracted positions.

In a preferred embodiment, the pads 124 and 132 can be formed from an elastomeric material disposed and/or stretched between the portions of the frames 120 and 128, respectively, defining an outer perimeter thereof. The elastomeric material can function as both an occupant support as well as a trim material. Thus, only a single layer of elastomeric material may be used as the pads 124 and 132. The elastomeric material can be thinner than the thickness of the frames 120 and 128 and thus provide a relatively thin and low profile second seat assembly 24. As a result, the seat assembly 24 can be very thin and lightweight. This elastomeric material is especially suited for a folding and/or nesting relationship as shown in the illustrated embodiment of the second seat assembly 24, as shown in FIGS. 1 through 5. The elastomeric material is preferably formed having sufficient strength and elongation to support a vehicle occupant in a sitting position in the vehicle seat assembly 24. The elastomeric material should not be rigid or brittle. Some examples of materials suitable for use as the elastomeric material include stretchy woven fabrics made from polypropylene, polyethylene, polyester, or other polymers.

To provide a resting relationship such that the second seat frames 120 and 128 generally lie within a common plane when in their retracted positions, the elastomeric material forming the pad 132 preferably extends between and from a rear portion 133 of the frame closest to the first seat assembly 20. The pad 132 and frame 128 define a recess in which the seat bottom frame 112 can be disposed therein when in its retracted position.

The second seat back 116 is shown in a seating position in FIG. 1 for supporting an occupant. The second seat back 116 includes an upper portion 136 and a lower portion 140. The second seat back 116 is movable between a retracted position for storage thereof, as shown in FIGS. 2, 3 and 4, and the seating position, as shown in FIG. 1. In the retracted position, as shown in FIGS. 2 through 4, the lower portion 140 of the second seat back 116 is adjacent to the back of the lower portion 104 of the first seat back 76. In the seating position, the lower portion 140 of the second seat back 116 is spaced apart from the lower portion 104 of the first seat back by a distance D, as shown in FIG. 1, to preferably provide a rearwardly facing inclined second seat back 116. The distance D can be any suitable length which provides a sufficient and comfortable reclining position for both the first seat back 76 and the second seat back 116. The upper portion 136 of the second seat back 116 is preferably pivotally connected to the upper portion 100 of the first seat back 76. Preferably, the upper portion 136 is adjacent the upper portion 100. The upper portion 36 of the second seat back 116 can be pivotally connected to the upper portion 100 of the first seat back 76 by any suitable manner, such as by a clip 192 having a generally C-shaped or O-shaped cross-section disposed about the generally horizontal portions 92a and 128a of the first seat back frame 92 and second seat back frame 128.

The rear portion of the second seat bottom 112 is preferably pivotally connected to the lower portion 140 of the second seat back 116, so as to allow pivotal movement of the second seat bottom 112 between the retracted and seating positions. The lower portion 140 of the second seat back 116 is preferably provided with a coupler or fastener, schematically shown at 144. The fastener 144 is operative to secure and unsecure the lower portion 140 of the second seat back 116 to the platform 16 via the first recess 40 and first protrusion 52 when the second seat back 116 is in the seating position. In a preferred embodiment, the fastener 144 is a catch or hook that is adapted to engage the first protrusion 52. The fastener 144 need not be a hook, but may by any suitable type of fastener, such as for example a latch, a plate or the like. Likewise, the lower portion 140 of the second seat back 116 may be permanently fixed to the platform 16 via the first recess 40 or any other suitable portion of the platform 16. The fastener 144 is preferably also operative to allow the second seat back 116 to disengage from the first protrusion 52.

The second seat bottom 112 includes a lower portion 148 and an upper portion 152. The second seat bottom 112 is movable between a retracted position (shown in FIGS. 2, 3 and 4) and a seating position shown in FIG. 1. In the retracted position, the upper portion 152 of the second seat bottom 112 is adjacent to the upper portion of the second seat back 116. In the seating position, the upper portion 152 of the second seat bottom 112 is spaced apart from the upper portion of the second seat back 116. The lower portion 148 of the second seat bottom 112 is operatively connected to the lower portion 140 of the second seat back 116. In a preferred embodiment, the lower portion 148 of the second seat bottom 112 is pivotally connected to the lower portion 140 of the second seat back 116 about a pivot 151. The upper portion 152 of the illustrated second seat bottom 112 is provided with a fastener, schematically shown at 156. The fastener 156 is preferably positioned and operative to secure the upper portion 152 of the second seat bottom 112 to the platform 16 via the second recess 44 and the second protrusion 56 when the second seat bottom 112 is in the seating position. In one possible embodiment, the fastener 156 is a plate that includes a notch formed therein adapted to engage the second protrusion 56. The fastener 156 may also function as a leg to provide a desired height of the upper portion 152 relative to the platform 16 for occupant comfort. The fastener 156 need not be a plate, but may by any suitable type of fastener, such as for example a latch, a hook or the like. Likewise, the lower portion 148 of the second seat bottom 112 may be permanently fixed to the second recess 44 or any other suitable portion of the platform 16. The fastener 156 is preferably also operative to allow the second seat bottom 112 to disengage from the second protrusion 56. The third recess 48 formed in the platform 16 is operative to receive an object, such as for example the feet of an occupant seated in the second seat bottom 112. It should be understood that a passenger might also be seated on the back tier 36 when the second seat bottom 112 is not employed.

The operation of the seat assemblies 20 and 24 will now be explained. FIG. 1 shows the second seat assembly 24 being used in its seating position. To move the second seat assembly 24 into its retracted position, the seat bottom 112 is preferably moved first. When the second seat bottom 112 is moved, as indicated by phantom lines in the direction indicated by an arrow 160, the upper portion 152 of the second seat bottom 112 has moved closer to the upper portion 136 of the second seat back 116. The second seat bottom 112 may be moved by any suitable mechanical, electrical, or manual operation. Note that the fastener 156 of the second seat bottom 112 is first disengaged from the second protrusion 56. The seat bottom 112 can be pivoted until the seat bottom 112 is nested within the seat back 116, as best shown in FIG. 5, so that the frames 120 and 128 generally lie in the same plane and the seat bottom 112 is disposed in the recess of the seat back 116.

FIG. 2 shows the first seat bottom 72 moved from its position in FIG. 1, as indicated by arrow 164. In a preferred embodiment, the front mount 64 and the intermediate mount 68 are pivotally mounted to the platform 16 and the first seat bottom 72 so as to allow the first seat bottom 72 to fold downwardly, from a raised position for occupant seating, to a lowered position for storage, towards the front tier 28 of the platform 16. The front portion 84 of the first seat bottom 72 has moved forward in FIG. 2. The back portion 88 of the first seat bottom 72 may be separated from the middle mount 60, and then unsecured therefrom.

FIG. 2 also shows the first seat back 76 being moved from its occupant seating position in FIG. 1, as indicated by arrow 168. The first seat back 76 is preferably pivotally mounted to the middle mount 60, allowing the upper portion 100 of the first seat back 76 to rotate towards the front portion 84 of the first seat bottom 72. The first seat back 76 is moved forward with respect to the position of the first seat back 76 in FIG. 1.

As described above, the first seat bottom 72 and the first seat back 76 are moved independently from each other. However, the first seat assembly 24 may be configured so that the first seat bottom 72 and the first seat back are moved simultaneously, thereby reducing the number of operations. For example, the first seat assembly 20 may include an optional linkage member, schematically shown with broken lines 200 in FIG. 3. The linkage member 200 operatively connects the first seat back frame 92 to the intermediate mount 68, so that movement of the first seat back 76 also moves the first seat bottom 72.

FIG. 2 also shows the second seat back 116 being moved from its seating position in FIG. 1, since the second seat back 116 of the second seat assembly 24 is preferably operatively connected to the first seat back 76 of the first seat assembly 20. The second seat back 116 is moved forward with respect to the position of the second seat back 116 in FIG. 1. The fastener 144 no longer secures the lower portion 140 of the second seat back 116 to the first recess 40. Any portions of the first seat assembly 20 and any portions of the second seat assembly 24 may be moved by any suitable mechanical or electrical means, including by manual operation. The directional arrow 172 indicates that the lower portion 140 of the second seat back 116 is moved closer to the lower portion 104 of the first seat back 76. The second seat back 116 may contact the first seat back 76, and preferably nests in a recess 93 formed in the rear portion of the first seat back 76, as can also be seen in FIG. 5. Thus, the second seat assembly 24 can generally fold up and be disposed in the recess 93 of the first seat assembly 20. The U-shaped frames 120, 128, and 92 may all be moved into nested positions within one another. Preferably, the frames 120, 128, and 92 all lie generally within a common plane. Although the frames 120 and 128 are shown slightly askew relative to the frame 92, mainly due to the interference fastener 144, it should be understood that the frames 120, 128, and 92, as described and claimed herein, do not have to lie exactly in the same plane, but rather generally lie in the same plane to provide a nested relationship. For example, the plane defined by the frame 92 may be from 0 to 10 degrees askew relative to the plane defined by the frame 128.

If desired, once the second seat assembly 24 is in its retracted position adjacent the first seat back 76, the seat back 76 of the first seat assembly 20 can be repositioned back to its seating position, as shown in FIG. 1 to provide occupant seating thereof. The mount 60 may include a recliner mechanism (not shown) capable of securing the seat back frame 92 of the seat back 7 in its reclined position, as shown in FIG. 1. Thus, the first seat assembly 20 can be used for occupant seating and the second seat assembly 24 can be in its retracted position to increase storage space behind the first seat assembly 20.

To continue moving the first seat assembly 20 to its retracted position, FIG. 3 shows the first seat bottom 72 and the first seat back 76 both moved from their positions in FIG. 2, as indicated by arrow 176 and arrow 180. The first seat bottom 72 is closer to the front tier 28 of the platform 16 compared to its position in FIG. 2. Likewise, the upper portion 100 of the first seat back 76 and the front portion 84 of the first seat bottom 72 are closer to the front tier 28 of the platform 16 compared to their positions in FIG. 2. The lower portion 140 of the second seat back 116 is still proximate the lower portion 104 of the first seat back 76. The back portion 88 of the first seat bottom 72 is preferably further from the middle mount 60 compared to its position in FIG. 2. The second seat assembly 24 is in its retracted position, as are the second seat bottom 112 and the second seat back 116. FIG. 4 shows further movement when the first seat bottom 72 and the first seat back 76 are proximate each other, and may touch each other. The first seat bottom 72 is closer to the front tier 28 of the platform 16 compared to its position in FIGS. 1, 2, and 3 and may touch the front tier 28 of the platform 16. The front mount 64 and the intermediate mount 68 are in their forward-most positions. It will be appreciated that the vehicle seat assembly 12 and the back tier 36 are generally approximately coplanar with respect to each other. Thus, FIG. 4 illustrates the first seat assembly 20 in its most retracted position. The stepped tiers 28, 32, and 36 provide for folding of the first seat assembly 20 so that the back surface is generally co-planar with the tier 36 for a generally flat load floor.

FIG. 5 illustrates that the vehicle seat assembly 12 may, but need not, include the seat assembly 12 and a second seat assembly 188 disposed laterally to one another. The second seat assembly 188 can be similar in structure and function to the seat assembly 12. In a preferred embodiment, the seat assembly 12 occupies about sixty percent of the total lateral width of the vehicle seating area, while the second seat assembly 188 occupies the remaining about forty percent. This seating arrangement is commonly referred to as a 60/40 split seat. It should be understood that the second seat assembly 188, when present, may occupy any suitable percentage of the total width of the vehicle seat assembly 12. Of course, the seat assembly 12 may also occupy the total width of the seating area. Likewise, a third seat assembly (not shown) may also be used in like manner as the second seat assembly 188.

The seat assembly 12 may include an optional center seat belt support structure, indicated schematically at 196. The support structure 196 includes a relatively rigid support framework for connection of a seat belt retractor 197 for dispensing an over the shoulder type seat belt or restraint for an occupant seated in a generally center position relative to the seat assembly 12 and the second seat assembly 188.

As discussed above, the second seat assembly 24 preferably nests into the first seat assembly 20. It will be appreciated that the second seat assembly 24 desirably nests into the recess 93 of the seat back 76 of the first seat assembly 20 when the second seat bottom 112 and the second seat back 116 are both in their retracted positions, as is shown in FIGS. 2, 3, 4, and 5. The second seat bottom 112 desirably nests into the second seat back 116 when the second seat bottom 112 is in its retracted position. The second seat back 116 desirably nests into the first seat back 76 of the first seat assembly 20 when the second seat back 116 is in its retracted position.

As best shown in FIG. 5, the seat assembly 12 may include a laterally extending rod 210 for which the frame 92 of the first seat back 20 and/or the frame 128 of the second seat back 116 can be pivoted mounted thereon. The rod 210 can provide support for the free ends of the members 120b and 128b of the frames 120 and 128, respectively.

The principle and mode of operation of this invention have been described in its preferred embodiments. However, it should be noted that this invention may be practiced otherwise than as specifically illustrated and described without departing from its scope.

I claim:

1. A vehicle seat assembly comprising:
 a forward facing first seat back having an upper portion and a lower portion; and
 a rearward facing second seat assembly including a second seat back having a lower portion and an upper portion, said upper portion of said second seat back being pivotally connected to said upper portion of said first seat back, wherein said second seat back is movable between a retracted position, wherein said lower portion of said second seat back is adjacent to said lower portion of said first seat back, and a seating position wherein said lower portion of said second seat back is spaced apart from said lower portion of said first seat back to provide a rearwardly facing inclined second seat back, and
 wherein said second seat back includes a fastener for releasably attaching said second seat back to a floor of the vehicle when said second seat back is in its seating position.

2. The seat assembly of claim 1, wherein when said second seat back is in said seating position, both said first and second seat backs are in an inclined position.

3. The seat assembly of claim 1, wherein said first seat back includes a recess formed in a rear portion thereof, and wherein said second seat back is disposed in said recess when in said retracted position.

4. The seat assembly of claim 1 further including a common headrest used for separate occupants seating in said first seat back and said second seat back.

5. The seat assembly of claim 1, wherein said first seat back includes a U-shaped frame member, and said second seat back includes a U-shaped frame member.

6. The seat assembly of claim 5, wherein said U-shaped frame member of said first seat back is larger than said U-shaped frame member of said second seat back such that said U-shaped frame member of said second seat back nests within said U-shaped frame member of said first seat back.

7. The seat assembly of claim 6, wherein said U-shaped frame members of said first and second seat backs generally lie within the same plane when said second seat back is in its retracted position.

8. The seat assembly of claim 1, wherein said rearward facing second seat assembly further includes a second seat bottom pivotally connected to said lower portion of said second seat back.

9. The seat assembly of claim 8, wherein said second seat bottom includes a fastener for releasably attaching said second seat bottom to a floor of the vehicle when said second seat bottom is in its seating position.

10. The seat assembly of claim 8, wherein said second seat bottom is moveable between a retracted position, wherein an upper portion of said second seat bottom is adjacent to said second seat back, and a seating position wherein said upper portion of the second seat bottom is spaced apart from said second seat back.

11. The seat assembly of claim 10, wherein said second seat back defines a recess, and wherein said second seat bottom is disposed in said recess of said second seat back when said second seat bottom is in said retracted position.

12. The seat assembly of claim 10, wherein said second seat back includes a U-shaped frame member, and said second seat bottom includes a U-shaped frame member.

13. The seat assembly of claim 12, wherein said U-shaped frame member of said second seat back is larger than said U-shaped frame member of said second seat bottom such that said U-shaped frame member of said second seat bottom nests within said U-shaped frame member of said second seat back.

14. The seat assembly of claim 13, wherein said U-shaped frame members of said second seat back and said second seat bottom generally lie within the same plane when said second seat bottom is in its retracted position.

15. The seat assembly of claim 1 further including a first seat bottom which provides a seating location for an occupant in cooperation with said first seat back.

16. The seat assembly of claim 15, wherein said first seat bottom is movable between a seating position, wherein a rear portion of said seat bottom is adjacent said lower portion of said first seat back, and a lowered position.

17. The seat assembly of claim 16, wherein said first seat back is pivotally mounted relative to said first seat bottom, and wherein said first seat back is movable to a position above said first seat bottom when said first seat bottom is in its lowered position.

18. The seat assembly of claim 1, wherein said second seat back includes a frame defining an outer perimeter and including an elastomeric material stretched between said frame to provide support for an occupant.

19. The seat assembly of claim 18, wherein said rearward facing second seat assembly further includes a second seat bottom pivotally connected to said lower portion of said second seat back, and wherein said second seat bottom includes a frame defining an outer perimeter and includes an elastomeric material stretched between said frame to provide support for an occupant.

20. A vehicle seat assembly comprising:

a forward facing first seat back having an upper portion and a lower portion; and a rearward facing second seat assembly including a second seat back having a lower portion and an upper portion, said upper portion of said second seat back being pivotally connected to said upper portion of said first seat back, wherein said second seat back is movable between a retracted position, wherein said lower portion of said second seat back is adjacent to said lower portion of said first seat back, and a seating position wherein said lower portion of said second seat back is spaced apart from said lower portion of said first seat back to provide a rearwardly facing inclined second seat back, and wherein said seat assembly further includes a first seat bottom which provides a seating location for an occupant in cooperation with said first seat back, and wherein said first seat bottom is movable between a seating position, wherein a rear portion of said seat bottom is adjacent said lower portion of said first seat back, and a lowered position.

* * * * *